United States Patent
Haupts et al.

(10) Patent No.: US 10,343,604 B2
(45) Date of Patent: Jul. 9, 2019

(54) ACOUSTIC WARNING SIGNAL DETECTION FOR MOTOR VEHICLES

(71) Applicant: FORD GLOBAL TECHNOLOGIES, LLC, Dearborn, MI (US)

(72) Inventors: Volker Haupts, Nordrhein-Westfalen (DE); Ralf Hecke, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/876,864

(22) Filed: Jan. 22, 2018

(65) Prior Publication Data

US 2018/0208113 A1    Jul. 26, 2018

(30) Foreign Application Priority Data

Jan. 20, 2017    (DE) .................. 10 2017 200 961

(51) Int. Cl.
*B60Q 9/00* (2006.01)
*G08G 1/16* (2006.01)
(Continued)

(52) U.S. Cl.
CPC ............ *B60Q 9/008* (2013.01); *B60Q 9/002* (2013.01); *G08G 1/166* (2013.01); *G08G 1/167* (2013.01);
(Continued)

(58) Field of Classification Search
None
See application file for complete search history.

(56) References Cited

U.S. PATENT DOCUMENTS 6,100,796 A    8/2000  Wagner et al.
6,902,025 B2*  6/2005  Spies ................ B60R 13/04
                                              180/274
(Continued)

FOREIGN PATENT DOCUMENTS

DE          10136981 A1    2/2003
DE       102004045690 A1   6/2005
(Continued)

OTHER PUBLICATIONS

German Patent and Trademark Office, German Search Report for the corresponding German Patent Application No. 10 2017 200 961.6 dated Aug. 14, 2017.

*Primary Examiner* — Chico A Foxx
(74) *Attorney, Agent, or Firm* — Frank A. MacKenzie; Brooks Kushman P.C.

(57) ABSTRACT

A method for operating a motor vehicle having at least one sound sensor for detecting acoustic signals generated outside the vehicle includes the steps of detecting an acoustic signal by means of the sensor, classifying the detected acoustic signal as a warning signal if the detected signal has defined features, determining the speed of the vehicle, determining the steering angle of the vehicle, defining an action to be carried out by the motor vehicle in response to the detected warning signal, and carrying out the defined action if the speed of the motor vehicle undershoots a defined threshold value and the steering angle of the vehicle exceeds a defined threshold value. The defined action may be a steering and/or braking maneuver by the vehicle, and/or may be alerting a driver of the vehicle.

14 Claims, 4 Drawing Sheets

(51) Int. Cl.
  *G10L 25/00* (2013.01)
  *G01S 15/93* (2006.01)
(52) U.S. Cl.
  CPC ............ *G10L 25/00* (2013.01); *G01S 15/931* (2013.01); *G01S 2015/932* (2013.01); *G08G 1/168* (2013.01)

(56) References Cited

U.S. PATENT DOCUMENTS

| | | | |
|---|---|---|---|
| 7,260,022 B2 | 8/2007 | Schliep et al. | |
| 7,502,677 B2* | 3/2009 | Weichenberger | B60R 21/013 280/735 |
| 7,714,719 B2* | 5/2010 | Duff | G01S 13/56 340/426.1 |
| 7,868,748 B2 | 1/2011 | Kiribayashi | |
| 7,876,645 B2 | 1/2011 | Bigliardi | |
| 9,235,937 B1* | 1/2016 | Weinberg | G07C 5/008 |
| 9,701,307 B1* | 7/2017 | Newman | B60W 50/16 |
| 2004/0246112 A1* | 12/2004 | Strumolo | B60Q 9/008 340/435 |
| 2005/0041529 A1 | 2/2005 | Schliep et al. | |
| 2006/0017295 A1* | 1/2006 | Danisch | B60R 21/0136 293/120 |
| 2006/0092043 A1* | 5/2006 | Lagassey | G07C 5/008 340/907 |
| 2007/0067081 A1 | 3/2007 | Ton | |
| 2007/0112513 A1* | 5/2007 | Mathevon | B60R 21/0136 701/301 |
| 2008/0077328 A1* | 3/2008 | Simmons | B60R 21/0136 701/301 |
| 2011/0209551 A1* | 9/2011 | Helldorfer | B60R 21/0132 73/658 |
| 2014/0136024 A1* | 5/2014 | Herthan | B60R 25/2045 701/2 |
| 2015/0197254 A1* | 7/2015 | Wysietzki | B60W 40/10 701/41 |
| 2016/0068158 A1* | 3/2016 | Elwart | B60W 10/00 701/41 |
| 2016/0217689 A1 | 7/2016 | Young | |
| 2017/0038466 A1* | 2/2017 | Salmen | G01S 17/89 |
| 2017/0210285 A1* | 7/2017 | Kobayashi | B60Q 1/50 |
| 2018/0178766 A1* | 6/2018 | Oba | B60W 50/10 |

FOREIGN PATENT DOCUMENTS

| | | | |
|---|---|---|---|
| DE | 102006032171 A1 | 1/2008 | |
| DE | 102006040653 A * | 3/2008 | ........ B60R 21/0136 |
| DE | 102007028400 B3 | 1/2009 | |
| DE | 102011116822 A1 | 4/2013 | |
| DE | 102013226040 A1 | 6/2015 | |
| DE | 102016006802 A1 | 12/2016 | |

\* cited by examiner

ACOUSTIC WARNING SIGNAL DETECTION FOR MOTOR VEHICLES

CROSS-REFERENCE TO RELATED APPLICATIONS

This application claims foreign priority benefits under 35 U.S.C. § 119(a)-(d) to DE Application 10 2017 200 961.6 filed Jan. 20, 2017, which is hereby incorporated by reference in its entirety.

TECHNICAL FIELD

The present invention relates to the detection of acoustic warning signals, for example warning vocalizations by a road user or knocking signals caused by a road user knocking on the vehicle body. The warning signals may be triggered by road users who are outside the vehicle and are attempting to alert the driver of the vehicle to their presence.

BACKGROUND

Passenger vehicles are nowadays typically moved by drivers who attempt to take into account and coordinate all influences on the road and influences from other vehicles by acting and reacting. This process requires the full attention of the driver. This is a great challenge, as proved by the number of accidents. In the meantime, autonomously driving vehicles and driver assistance systems which support driving safety have been developed. Examples of these are lane keeping assistance systems (lane keeping assistant), a lane change assistant, a blind spot assistant (blind spot support), a braking assistant (active city stop) and further systems.

Hitherto, there has been no assistance system which reacts to pedestrians or cyclists who are in danger of being put at risk by the vehicle. The document US 2007/0067081 A1 discloses a device for avoiding traffic accidents in which at least one motorized vehicle is involved. In this case, the vehicle comprises an apparatus for detecting the presence of another road user in the immediate vicinity of the side of the vehicle with the aid of distance sensors which are fitted to the side of the vehicle. Provision is also made of acoustic sensors, for example microphones, which are fastened to a side of a trailer in order to make warning cries from other road users, for example, audible to the driver.

The document U.S. Pat. No. 7,876,645 B2 discloses a system and a method for detecting obstacles for vehicles. The document U.S. Pat. No. 6,100,796 likewise relates to an obstacle detection system in a motor vehicle. The document U.S. Pat. No. 7,868,748 B2 discloses a collision detection sensor for a vehicle.

SUMMARY

Against this background, the object of the present invention is to provide an advantageous method for operating a motor vehicle, which method improves the safety of cyclists and pedestrians or other road users with respect to a collision with the motor vehicle.

A disclosed embodiment of a method for operating a motor vehicle relates to a motor vehicle which comprises at least one sensor for detecting acoustic signals generated outside the vehicle. The method comprises the following steps: an acoustic signal, preferably an acoustic signal generated outside the vehicle, is detected by means of the sensor. The detected acoustic signal(s) may have been generated, for example, by a road user outside the vehicle. The detected acoustic signal is classified as a warning signal if the detected signal has defined features. The speed of the vehicle is determined. The steering angle of the vehicle is determined. An action to be carried out by means of the motor vehicle in response to the detected warning signal is defined or determined. The defined action of the motor vehicle in response to the detected warning signal is carried out if the speed of the vehicle undershoots a defined threshold value and the steering angle of the vehicle exceeds a defined threshold value.

In principle, the stated order of the method steps is not compulsory. For example, the speed and the steering angle can be determined at the same time or in any desired order.

The disclosed embodiments include equipping the vehicle with one or more sensors, which make it possible to detect, for example, warning cries (vocalizations) or cries for help from cyclists or pedestrians or to detect signs of an impact on the vehicle body caused by a cyclist or pedestrian knocking on the body of the vehicle, and of then causing a quick and adequate reaction of the vehicle or of the driver causing said reaction after the driver has been accordingly notified.

The action to be carried out as part of the method preferably comprises outputting a warning message to the driver of the vehicle. Additionally or alternatively, the action to be carried out may comprise braking and/or stopping the vehicle. Furthermore, the action to be carried out may additionally or alternatively comprise steering the vehicle, preferably steering the vehicle in a direction which leads away from the direction from which the warning signal was emitted. This keeps the vehicle away from imminent danger, for example a collision with a cyclist or pedestrian. In the case of an autonomous vehicle, the actions mentioned can be carried out automatically.

In one advantageous disclosed embodiment of a method, the amplitude or the sound pressure level and/or the frequency of the detected signal is/are determined. An amplitude threshold value is also defined, and a detected acoustic signal is qualified or considered or classified as a warning signal if the amplitude of the detected signal exceeds the amplitude threshold value. Additionally or alternatively, a frequency threshold value is defined, and a detected acoustic signal is qualified or classified as a warning signal if the frequency of the detected signal exceeds the frequency threshold value. For example, the amplitude, preferably the average amplitude, of the ambient noises, that is to say of the traffic noise for example, can be determined. In this case, the amplitude threshold value can be defined on the basis of the amplitude of the ambient noises or traffic noise.

In principle, the vehicle may comprise a body and the acoustic signal may be detected with the aid of a sensor which is fitted to the body. In particular, the vehicle may comprise a structure-borne sound sensor and the acoustic signal may be detected with the aid of the latter. In this case, the structure-borne sound sensor may be in the form of a knocking or impact sensor. The structure-borne sound sensor may preferably be fitted to an underside of the trunk lid or else on or below the sheet metal of the body at another location of the vehicle. Additionally or alternatively, the vehicle may comprise an antenna and the acoustic signal may be detected with the aid of a sensor which is fitted to the antenna or is integrated in the antenna. The antenna may be arranged on the roof of the motor vehicle, for example.

In one advantageous variant, the vehicle comprises parking assistance sensors or position sensors or parking aid sensors, in particular for determining the distance between an object and the vehicle. The parking assistance sensors or alternatively mentioned sensors can be used to define the actions to be carried out, for example to determine the position of the warning signal source or the position of a road user with respect to the vehicle and/or to determine the distance between the warning signal source or a road user generating the warning signal and the vehicle. This has the advantage that sensors which are already present in the vehicle are also used to carry out the present method and no additional costs for sensors which possibly need to be retrofitted therefore become necessary.

In one variant which is preferred, for example, for detecting warning cries from road users, the frequency pattern of the detected signal is determined. The frequency pattern is compared with reference frequency patterns. A signal is characterized or classified as a warning signal if it corresponds to a reference pattern within a defined deviation.

The detected acoustic signal can be recorded for a particular period. This makes it possible to distinguish human warning cries from other ambient noises, for example. In particular, it is also possible to distinguish between "normal" cries which occur during conventional road traffic and cries which indicate a dangerous situation.

A first criterion for detecting a cry in road traffic may be the amplitude or the volume of the acoustic signal (decibels). An amplitude or volume peak threshold value of the traffic noise can be measured a short period of time after detecting a warning signal. The measured amplitude peak threshold value or the maximum ambient volume can be stored and updated. In principle, the amplitude peak threshold value can be updated at regular intervals.

It is also possible to distinguish between "normal" traffic noise from vehicles and human voices. The characteristic of a human voice makes this possible. The frequency of a voice is unique and can be compared with other traffic noise frequencies. If a cry from a road user has a higher amplitude or volume than the defined amplitude threshold value, this can be identified as part of the method.

The amplitude or volume need not be the main criterion for reliably detecting a warning cry from a road user. The special characteristic of a voice is likewise a suitable criterion. The characteristic of the voice of a road user contains information relating to his emotional state. In particular, the intonation of the voice changes if the road user fears something. The voice then becomes shaky and changes to a higher pitch. For example, voice stress analysis is able to detect the typical shaking of the frequency of the voice. This can be represented with the aid of a graph. The partial increase in the frequency can be used as a second criterion for detecting a warning cry. If both criteria are preferably satisfied, the method can separate out normal cries and possible misuse.

The motor vehicle according to the invention is characterized in that it is designed to carry out the method according to the invention described above. It therefore has the same advantages and features as the method already described. The vehicle comprises at least one sensor for detecting acoustic signals generated outside the vehicle. These may be, for example, sensors which are designed to detect knocking signals (impacts) and/or cries for help from road users.

The vehicle may also comprise a body and at least one sensor may be arranged on the body. In particular, vehicle may comprise a trunk lid or a roof and at least one sensor may be arranged on an underside of the trunk lid or underside of the roof of the vehicle. Additionally or alternatively, the vehicle may comprise an antenna and at least one sensor may be arranged on the antenna or may be integrated in the antenna. At least one sensor may be in the form of a structure-borne sound sensor.

The motor vehicle may preferably comprise a signal analysis module for determining the amplitude and/or the frequency of the detected signal.

In principle, the motor vehicle used within the scope of the method according to the invention and the motor vehicle according to the invention may be a passenger vehicle or an autonomous vehicle.

Further features, properties and advantages of the present invention are described in more detail below on the basis of exemplary embodiments with reference to the accompanying figures. Elements which correspond to one another in the figures are denoted using the same reference numerals. All features described previously and below are advantageous both individually and in any desired combination with one another. The exemplary embodiments described below are only examples which do not, however, restrict the subject matter of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
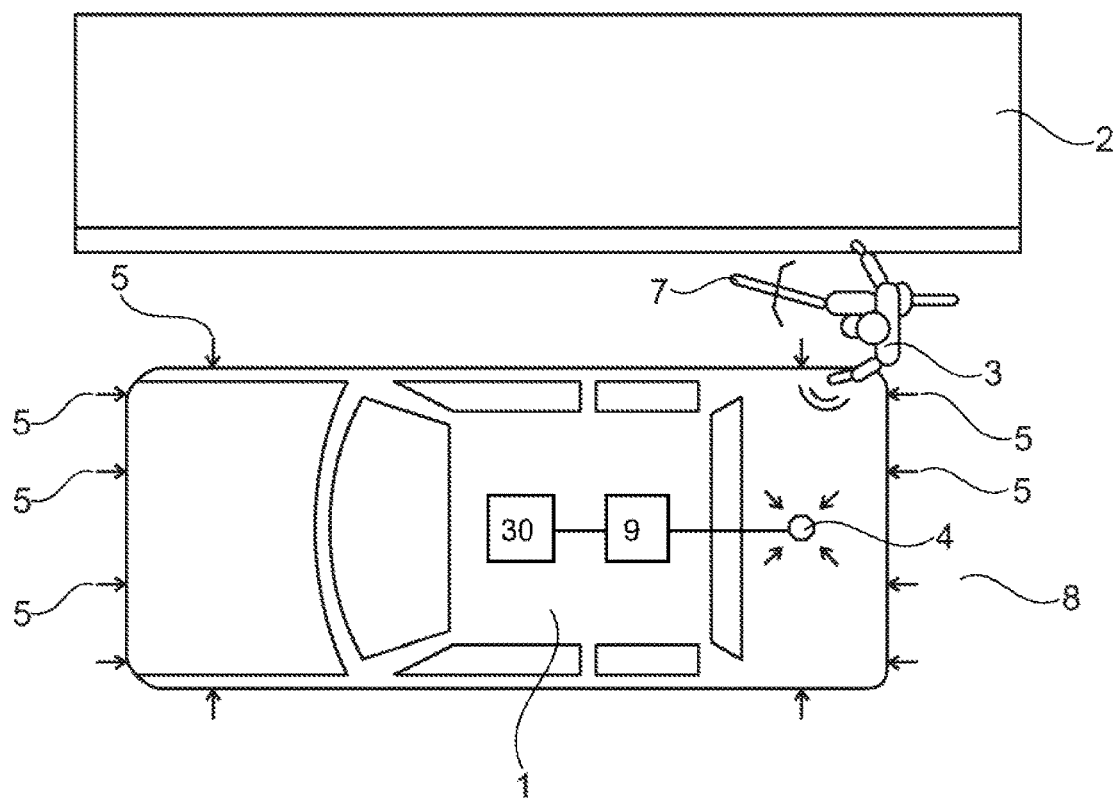
FIG. 1 schematically shows a plan view of a motor vehicle according to the invention when using the method according to the invention to protect a cyclist.

FIG. 1 schematically shows a plan view of a motor vehicle 1. The motor vehicle is a passenger vehicle or an autonomous motor vehicle. The motor vehicle 1 moves along on a road 8 in a direction of travel. The road is bounded by a sidewalk 2.

Furthermore, a road user 3 on a bicycle 7 likewise moves along on the road in the direction of travel of the motor vehicle 1. In this case, the bicycle 7 with the road user 7 is between the motor vehicle 1 and the sidewalk 2. The road user 3 perceives he is in danger of being pushed against the sidewalk 2 by the vehicle 1. He therefore knocks against the body of the vehicle 1.

The motor vehicle 1 is equipped with an acoustic sensor in the form of a structure-borne sound sensor or knocking/impact sensor 4. The acoustic sensor 4 is preferably fastened under the trunk lid or else on or under the sheet metal of the body at a different location. The vehicle also comprises a number of parking assistance sensors 5. The parking assistance sensors 5 are configured in such a manner that they detect an object, the bicycle 7 and the cyclist 3 in the present example, in the immediate environment of the vehicle 1. In an advantageous configuration variant, the parking assistance sensors 5 are configured in such a manner that they can determine the position and the distance of the detected object, the cyclist 3 and the bicycle 7 in the example below, from the motor vehicle 1.

The motor vehicle 1 is further equipped with a signal analysis module 9 and a driver assistance system 30. Signal analysis module 9 receives signals from the sensor 4 and (in a manner well known to persons of skill in the art) determines relevant characteristics (amplitude and/or frequency, for example) of the sound detected by the sensor 4. Driver assistance system 30 is of the general type that is well known in the art and generates vehicle control interventions (steering and braking, for example) based upon inputs it receives from numerous sensors and systems throughout the vehicle. Most pertinent to the present disclosed invention, included in these sensors/systems are the parking assistance sensors 5, signal analysis module 9, steering angle sensor, and speedometer.

Figure 2:
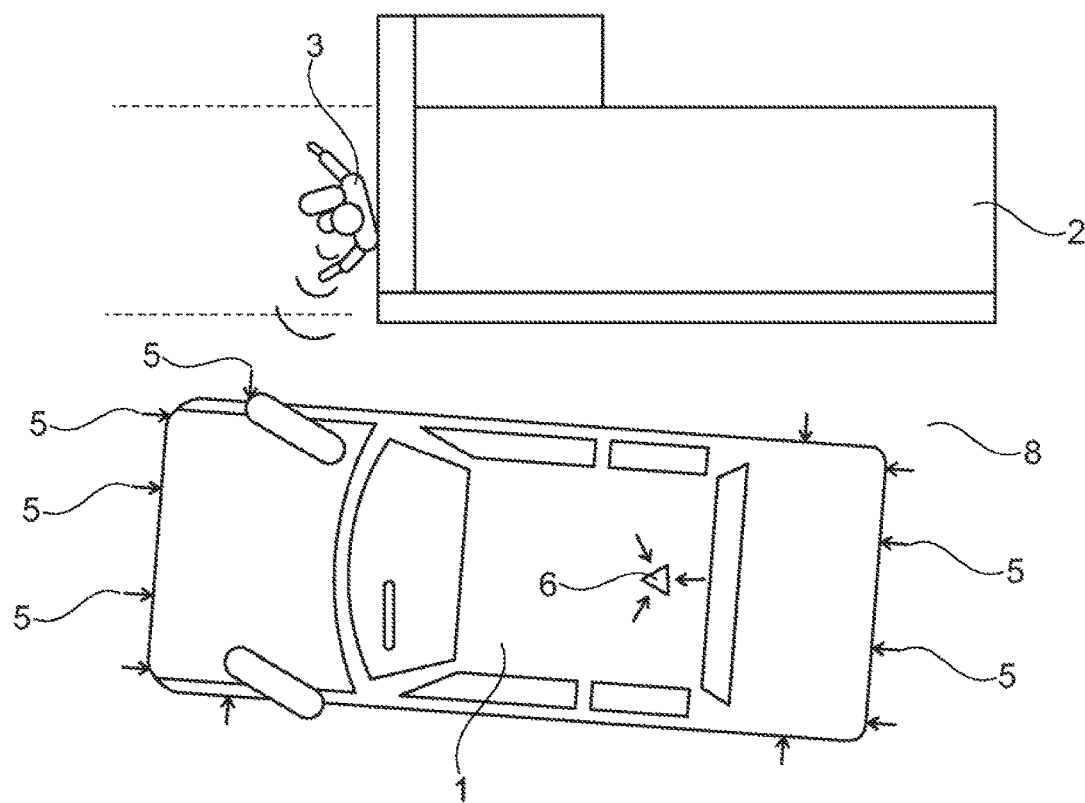
FIG. 2 schematically shows a plan view of a further embodiment variant of a motor vehicle according to the invention when carrying out the method according to the invention in order to protect a pedestrian.

FIG. 2 shows a further traffic situation with a motor vehicle 1 according to the invention, in which the method according to the invention can be used. In the variant illustrated, the motor vehicle 1 according to the invention turns right into a side road. A pedestrian 3 is in the process of leaving the sidewalk 2 and crossing the road into which the motor vehicle 1 has just turned. The pedestrian 3 feels threatened by the vehicle 1 and therefore utters a warning cry.

The vehicle 1 comprises an acoustic sensor 6. The acoustic sensor 6 is preferably designed to detect ambient noises and, in particular, loud cries from road users. The motor vehicle 1 also comprises an antenna which is arranged on the motor vehicle 1 in the example shown. In the present embodiment variant, the acoustic sensor 6, also called a warning cry sensor, is integrated in the antenna of the vehicle 1 or is fitted to said antenna. Furthermore, the vehicle 1 shown in FIG. 2 also has the parking assistance sensors 5 already described in connection with FIG. 1.

In principle, a vehicle 1 according to the invention has one or more on-board sensors. In this case, one of the sensors may be an acoustic sensor for detecting warning cries which have been uttered, in particular, by cyclists or pedestrians. One example of this is shown in FIG. 2. When carrying out the method according to the invention, the vehicle can react to a detected warning cry, for example by means of braking or steering in a direction which is safer for the affected road user 3. In the example shown in FIG. 1, the vehicle 1 could be steered somewhat to the left. In the example shown in FIG. 2, the turning operation could be stopped and/or the vehicle 1 could be steered slightly more to the left.

In connection with detected warning cries, a distinction is made between "normal" cries which regularly occur in road traffic and warning cries which indicate a dangerous situation within the scope of the method according to the invention. The parking assistance sensors 5 which are present on the vehicle and are arranged around the vehicle, for example, can be advantageously used to detect a road user 3, for example a pedestrian or cyclist, behind or beside the vehicle and to control the action to be carried out, for example a steering maneuver into a position which is less dangerous for the road user.

The second sensor mentioned may be an acoustic sensor for detecting signs of an impact (knocking or strikes) on a piece of metal of the vehicle, for example the body, or against the windows of the vehicle. If a pedestrian or a cyclist or other road user is able to knock against the vehicle body, this indicates that he is very close to the vehicle. He is possibly in danger and draws attention to himself in this manner, that is to say by knocking or striking the vehicle with hand/arms and/or feet/legs. As already described in connection with the first sensor (warning cry sensor), the vehicle can react to the detected knocking/impact signal, for example by means of braking or by means of a steering maneuver in a direction which is safer for the road user.

In principle, the vehicle according to the invention may comprise both an acoustic sensor 4, as described in connection with FIG. 1, and an acoustic sensor 6, as described in connection with FIG. 2, for example.

Figure 3:
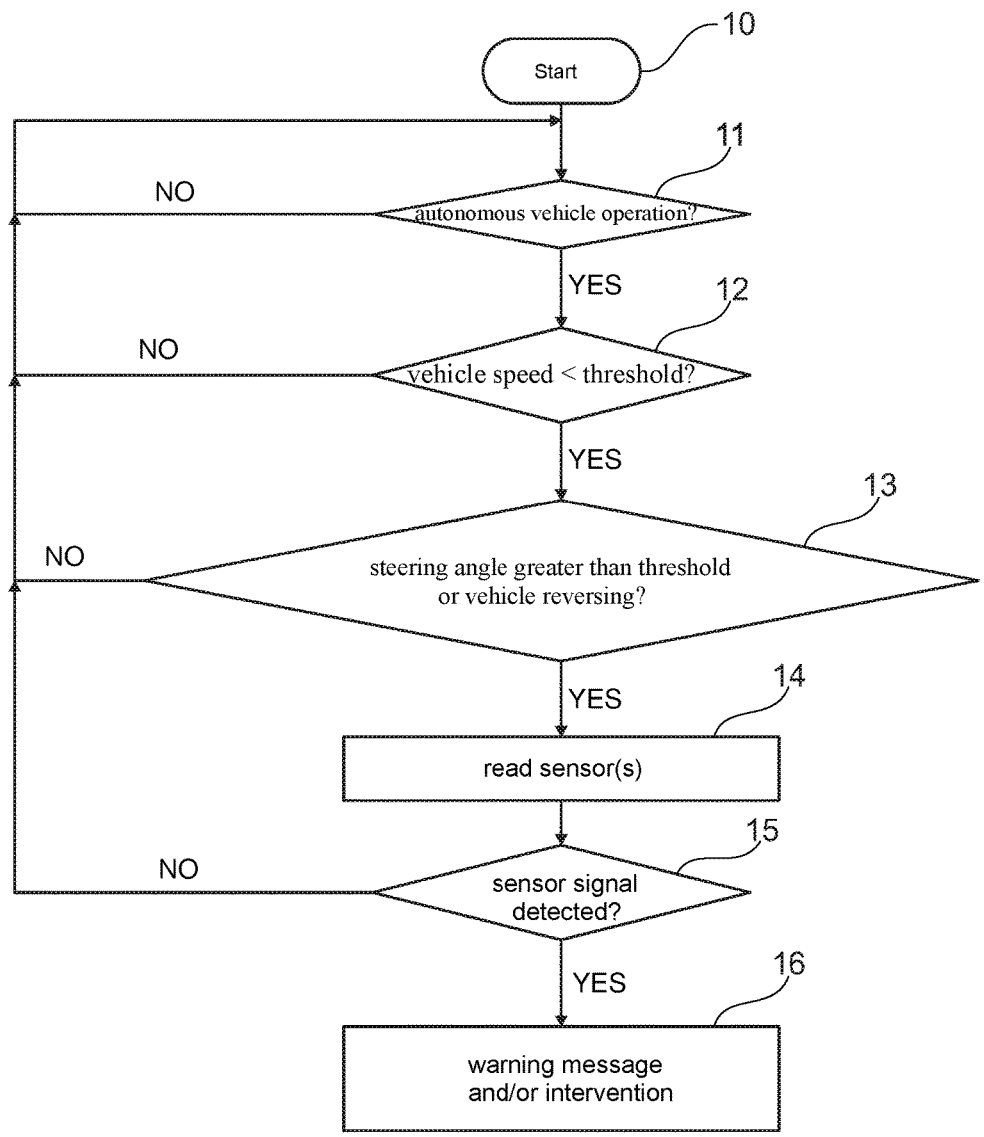
FIG. 3 schematically shows a variant of the method according to the invention in the form of a flowchart.

An example of the method according to the invention is described below on the basis of FIG. 3. Although the method is described by way of example for an autonomous driving mode, it can similarly also be used for non-autonomous driving.

The method begins in step 10. In step 11, a check is carried out in order to determine whether the vehicle is being operated autonomously. As already mentioned, this step is optional. In the example shown in FIG. 3, the process returns to the starting block 10 if no autonomous driving has been activated. If autonomous driving has been activated, a check is then carried out in step 12 in order to determine whether the vehicle speed is less than a defined threshold speed. If this is not the case, the method returns to the start 10. If the vehicle speed is less than the threshold speed, a check is then carried out in step 13 in order to determine whether the steering angle or steering wheel angle is greater than a defined threshold angle or the vehicle is reversing. If this is not the case, the method returns to the start 10. If the steering angle is greater than the defined threshold angle, the acoustic sensors 4 and/or 6 on the vehicle 1 are read in step 14. If a signal is detected in step 15, a warning message is output to the driver or the vehicle is stopped in step 16. If a signal has not been detected in step 15, the method returns to the start 10. As an alternative to the reaction measures mentioned, that is to say the warning of the driver or the stopping of the vehicle, a steering maneuver or another suitable measure may also be initiated.

Figure 4:
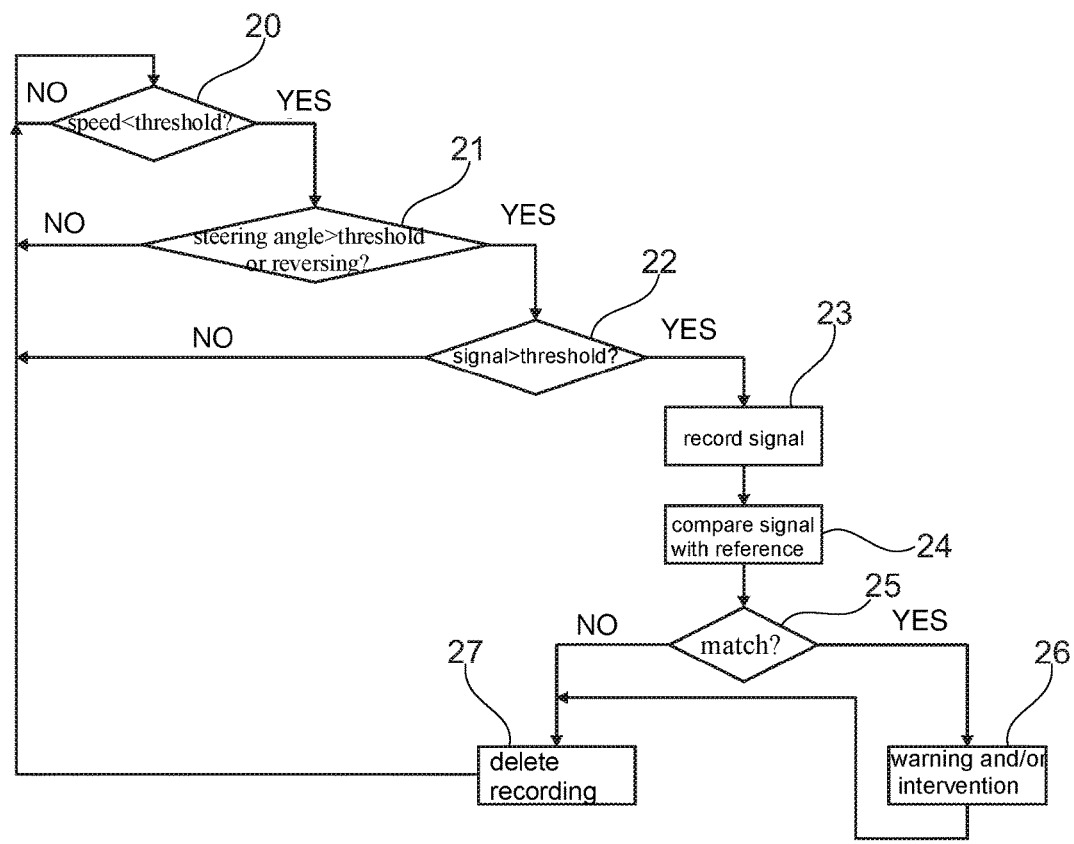
FIG. 4 schematically shows a further embodiment variant of a method according to the invention in the form of a flowchart.

A further embodiment variant for a method according to the invention, in particular in connection with the detection of warning cries, is described below on the basis of FIG. 4. In this variant too, the method can be used both for autonomous driving and for driving controlled by a driver.

A check is first of all carried out in step 20 in order to determine whether the vehicle speed is less than a defined threshold value. If this is not the case, the method is reset. If this is the case, a check is carried out in step 21 in order to determine whether the steering wheel angle is greater than a defined threshold value or the vehicle is reversing. If this is not the case, the method is reset to the start. If this is the case, a check is carried out in step 22 in order to determine whether a detected acoustic signal, for example a crying noise, has a higher amplitude or volume (for example in decibels) than a defined threshold value. This threshold value can be determined and defined, in particular, on the basis of the current traffic noise surrounding the vehicle. If this condition is not met, the method is reset to the start. If this is the case, the detected signal is recorded for a defined period, for example for several milliseconds, in step 23.

In step 24, the recorded signal is then compared with "warning cries" which are recorded in advance and are typical of situations of fear and dangerous situations. A check is carried out in step 25 in order to determine whether the recorded signal corresponds to the reference signals, that is to say the reference warning cries recorded in advance, or corresponds taking into account a previously defined permissible deviation. If this is not the case, the recording is deleted in step 27. If there is correspondence, the driver of the vehicle 1 is warned and/or interaction with the autonomous vehicle is carried out in step 26.

In principle, individual steps of the method can also be carried out in a different order. For example, steps 12 and 13 can be swapped with one another in the example shown in FIG. 3. If necessary, step 14 can also be carried out before or between steps 12 and 13. In a similar manner, in the example shown in FIG. 4, step 21 can also be carried out before step 20 and step 22 can be carried out before or between steps 20 and 21.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
operating a sound sensor mounted to a trunk lid of a motor vehicle to detect a road user knocking on an exterior panel of the vehicle, wherein the road user is one of a pedestrian and a cyclist; and
operating a driver assistance system of the vehicle to determine a speed and a steering angle of the vehicle, determine whether the speed undershoots a first value and the steering angle exceeds a second value, and carry out an automatic braking and/or steering intervention by the vehicle in response to the knocking.

2. The method of claim 1, wherein the knocking is determined as having been performed by the road user by comparing an amplitude of the knocking with a threshold amplitude value.

3. The method of claim 2, wherein the threshold amplitude value is defined based upon an amplitude of ambient noises outside the vehicle.

4. The method of claim 1, wherein the knocking is determined as having been performed by the road user by comparing a frequency of the knocking with a threshold frequency value.

5. The method of claim 1, further comprising:
operating a parking assistance sensor of the vehicle to determine a location of the road user relative to the vehicle; and
using the location to determine a nature of the automatic braking and/or steering intervention.

6. A method comprising:
operating a sound sensor mounted on a trunk lid of a motor vehicle to detect an impact on an exterior panel of the vehicle;
determining the impact was made by a road user knocking on the exterior panel, wherein the road user is one of a pedestrian and a cyclist;
determining a speed and a steering angle of the vehicle; and
operating a driver assistance system of the motor vehicle to output a warning message to a driver of the vehicle in response to the knocking if the speed undershoots a first value and the steering angle exceeds a second value.

7. The method of claim 6, further comprising activating the driver assistance system to brake and/or steer the vehicle in response to the knocking if the speed undershoots the first value and the steering angle exceeds the second value.

8. The method of claim 6, wherein the step of determining the impact is the road user knocking comprises:
comparing an amplitude of the impact with a threshold amplitude value; and
classifying the impact as the road user knocking if the amplitude exceeds the threshold amplitude value.

9. The method of claim 8, wherein the threshold amplitude value is defined based upon an amplitude of ambient noises outside the vehicle.

10. The method of claim 6, wherein the step of determining the impact is the road user knocking comprises:
comparing a frequency of the impact with a threshold frequency value; and
classifying the impact as the road user knocking if the frequency exceeds the threshold frequency value.

11. The method of claim 6, further comprising:
operating a parking assistance sensor of the vehicle to determine a location of the road user relative to the vehicle; and
using the location to determine the action to be carried out.

12. A motor vehicle comprising:
a sound sensor mounted to a trunk lid of the vehicle and operative to detect a sound made by an impact on an exterior panel of the vehicle;
a signal analysis module determining an amplitude and/or frequency of the sound and based on the amplitude and/or frequency determining that the impact was a knocking by a road user, wherein the road user is one of a pedestrian and a cyclist; and
a driver assistance system operative to monitor a speed and a steering angle of the vehicle and to carrying out an action by the motor vehicle in response to the knocking if the speed undershoots a first value and the steering angle exceeds a second value.

13. The motor vehicle of claim 12, further comprising:
a parking assistance sensor operative to determine a location of the road user relative to the vehicle, and the driver assistance system uses the location to determine the action to be carried out.

14. The motor vehicle of claim 13, wherein the signal analysis module is operative to compare the amplitude of the sound with a threshold amplitude value defined based upon an amplitude of ambient noises outside the vehicle.

* * * * *